July 24, 1923.
H. HILLMANN
BOTTLE HANDLING DEVICE
Filed April 30, 1919
1,462,546
3 Sheets-Sheet 1
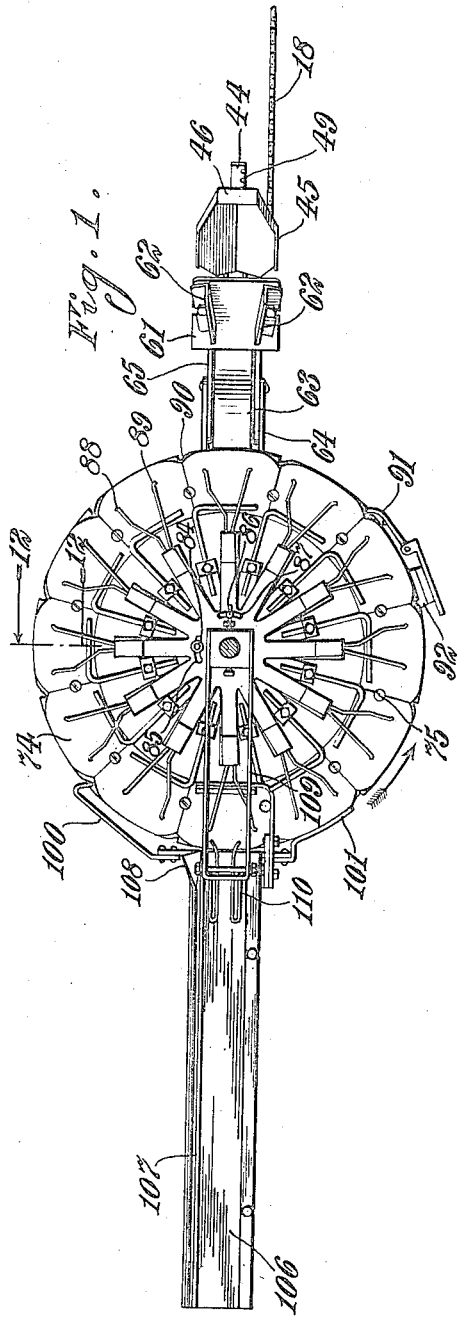
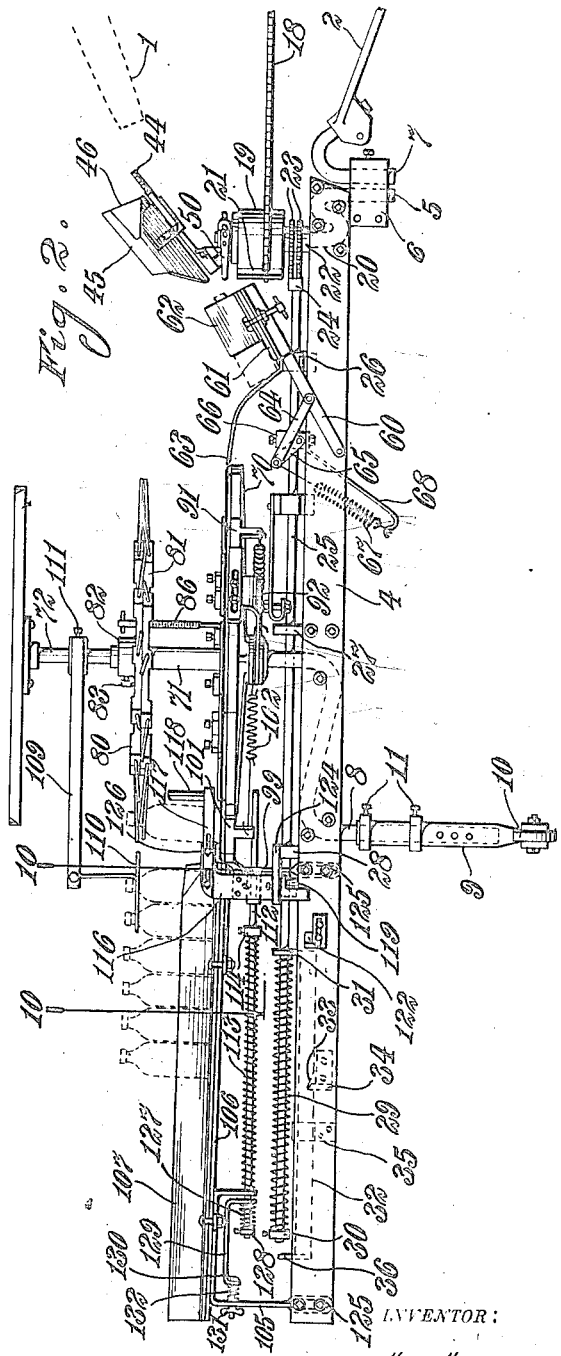
INVENTOR:
HANS HILLMANN,
BY
HIS ATTORNEY.

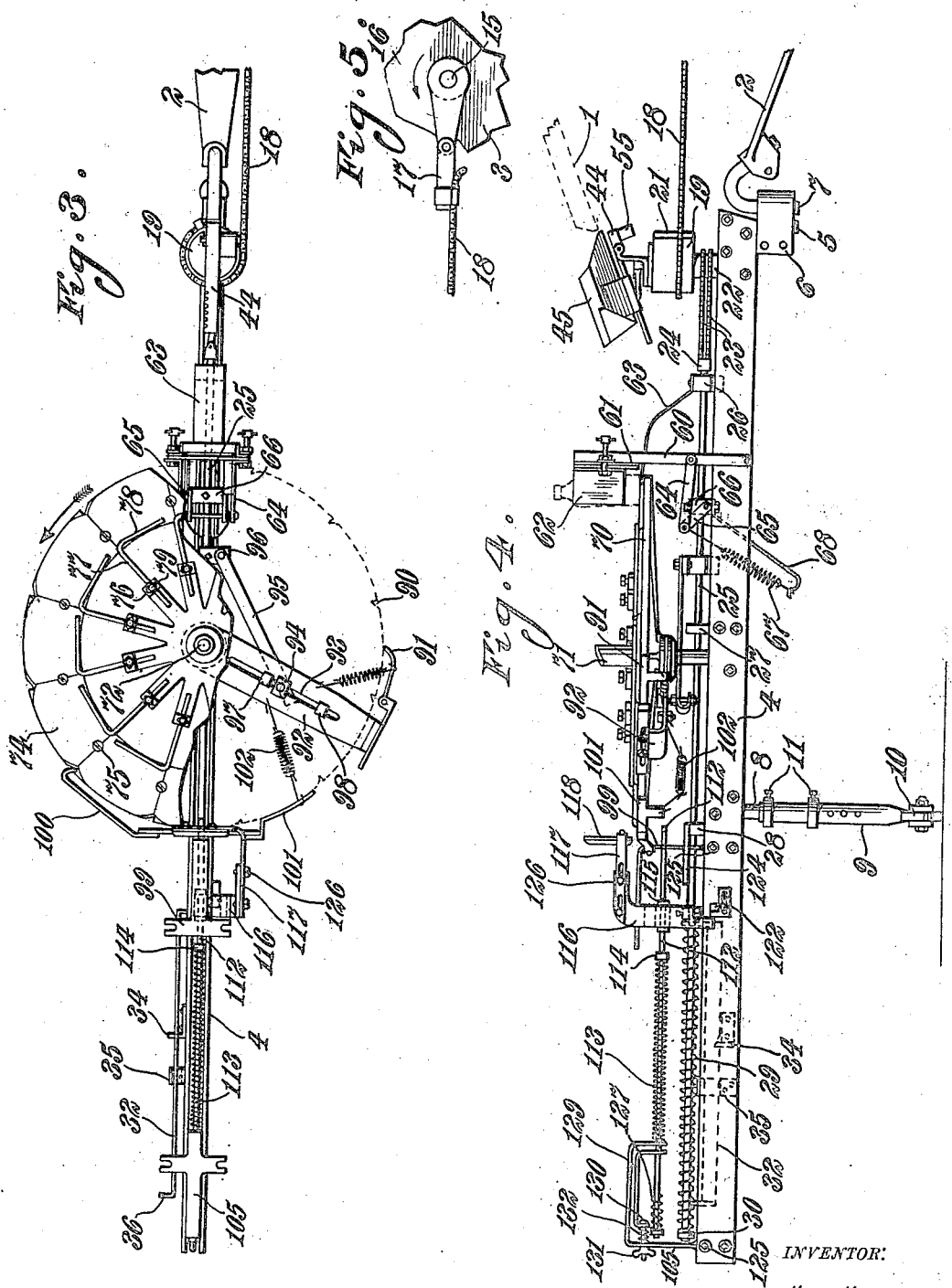

July 24, 1923.
H. HILLMANN
BOTTLE HANDLING DEVICE
Filed April 30, 1919      3 Sheets-Sheet 3
1,462,546
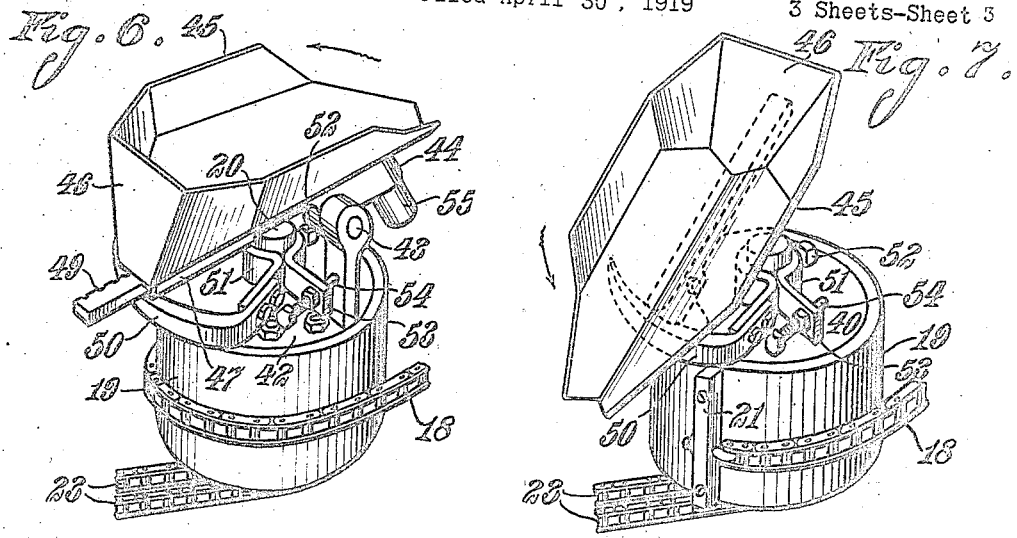
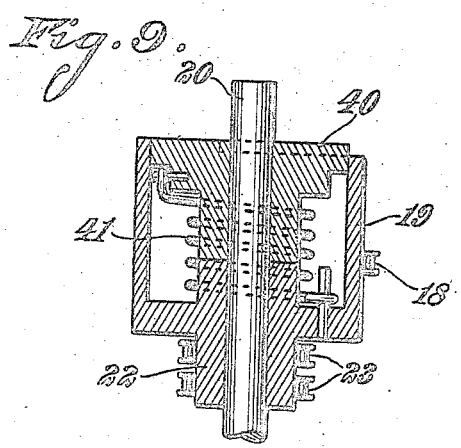
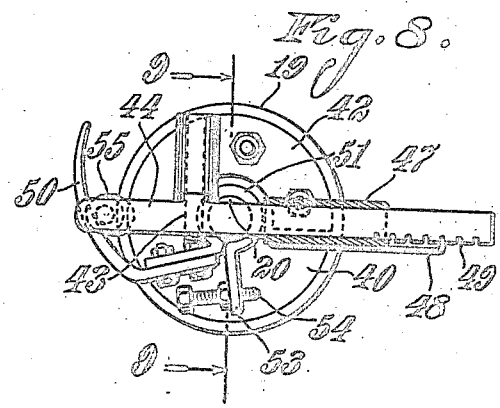
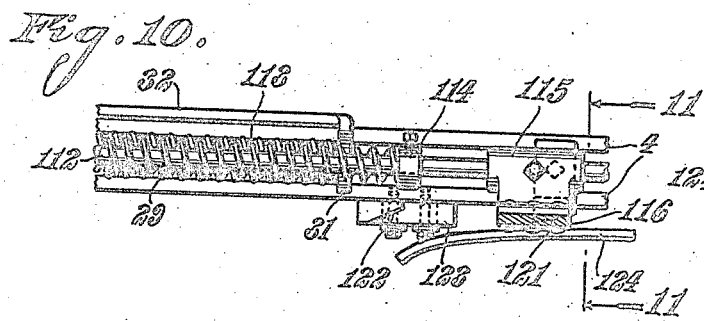
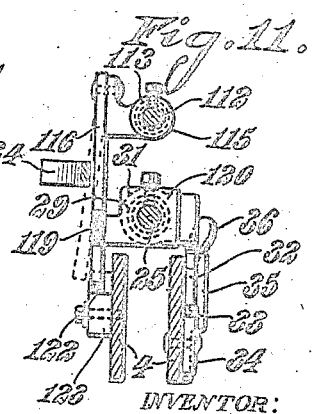
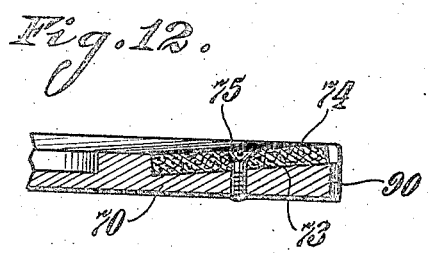
INVENTOR:
HANS HILLMANN,
BY John N Bruninga
HIS ATTORNEY Patented July 24, 1923.

1,462,546

UNITED STATES PATENT OFFICE.

HANS HILLMANN, OF ALTON, ILLINOIS, ASSIGNOR TO ILLINOIS GLASS COMPANY, OF ALTON, ILLINOIS, A CORPORATION OF ILLINOIS.

BOTTLE-HANDLING DEVICE.

Application filed April 30, 1919. Serial No. 293,387.

*To all whom it may concern:*

Be it known that I, HANS HILLMANN, a citizen of Germany, and residing at Alton, in the State of Illinois, have invented certain new and useful Improvements in Bottle-Handling Devices, of which the following is a specification.

This invention relates to a bottle handling device, and more particularly, to a device designed for use as an adjunct to and adapted to receive the bottles from a bottle forming machine so as to assemble the bottles in order to permit their transportation to the leer.

In the manufacture of glass bottles, these bottles are discharged in rapid succession from a bottle forming machine and they must then be transported to the leer in order to be annealed. The bottles as discharged from the bottle forming machine are, however, too hot to be handled and they must, therefore, be allowed to cool somewhat. In order to permit a number of these bottles to be transported by means of the usual paddle or tong, they should be assembled in order that quite a number may be picked up at the same time. These bottles are discharged from the bottle forming machine top down and the bottle handling device, must, therefore, invert the same so as to deliver them in assembled form with the necks up.

One of the objects of this invention, therefore, is to provide a bottle handling device which will receive the bottles successively from a bottle forming machine, invert the same, allow them to cool for a short period and assemble them in a row so as to permit quite a number of the assembled bottles to be readily taken by a paddle or tong and transported to the leer.

Another object is to improve the device as to details and more particularly to provide improved inverting mechanism, placing mechanism, cooling mechanism, take-off mechanism and assembling mechanism.

Another object is to improve the device generally so as to simplify the construction and render its operation more efficient and effective.

Further objects will appear from the detail description taken in connection with the accompanying drawings, in which:

Figure 1 is a plan of a bottle handling device embodying this invention;

Figure 2 is a side elevation;

Figure 3 is a view similar to Figure 1, but with parts thereof removed;

Figure 4 is a view similar to Figure 2 with parts removed and showing the mechanism in another position;

Figure 5 is a detail of the actuating mechanism;

Figure 6 is a perspective view of the receiver or inverter in receiving position;

Figure 7 is a similar view showing the receiver in delivering position;

Figure 8 is a detail plan showing the receiver proper removed;

Figure 9 is a section on the line 9—9, Figure 8, showing the receiver and its actuating cam removed;

Figure 10 is a section on the line 10—10, Figure 2;

Figure 11 is a section on the line 11—11, Figure 10; and

Figure 12 is an enlarged detail section on the line 12—12, Figure 1.

Referring to the accompanying drawings, and more particularly to Figures 1 to 5 inclusive, 1 designates a trough attached to the bottle forming machine into which the bottles are delivered from the bottle forming machine in an inverted position and 2 and 3 are brackets attached to the bottle forming machine, only a fragment of bracket 3 being shown.

The bottle handling device comprises a frame 4 consisting of spaced side members held in spaced relation in any suitable manner, as by collars or brackets and connected by bolts. This frame is provided at one end with a shank 5 clamped between the side members and pivoted in a bracket 6 attached to a shank 7 secured in the bracket 2 of the bottle forming machine. Secured intermediate the ends of the frame is a shank 8 which has a telescopic connection with a support 9 bearing at its lower end casters or rolls 10 rolling on the floor. The shank is secured in the support by one or more set screws 11 so that the height of the frame may be readily adjusted. The pivotal connection of the frame with the bottle forming machine is through the medium of the shank 5 which is concentric with the point of delivery from bottle forming machine trough 1 and the point of entrance of the bottle to the bottle receiver so that the frame may be swung to any desired position, but always remain in the proper cooperative relation with respect to the bottle forming machine.

*The actuating mechanism.*

Mounted in the bracket 3 of the bottle forming machine is a shaft 15 which is driven from the bottle forming machine. This shaft has mounted thereon a crank 16 which has pivoted thereto a bracket 17 connected to one end of a chain 18. This chain passes partially around the circumference of a head or carrier 19 mounted for oscillation on a shank 20 on the frame and which constitutes a continuation of the shank 5 and this chain is attached to a rib 21 on the carrier. The carrier has a reduced portion 22 of cylindrical form around which passes a pair of chains 23, secured similarly as the chain 18, and the free ends of these chains are connected to a bracket 24 on a sliding actuator 25 supported in bearings 26, 27 and 28 along the frame 4.

This actuator is encircled by a spring 29 bearing at one end against a collar 30 fixed to the actuator and at its other end against a lug 31 loosely encircling the actuator, and formed on one end of a bar 32 extending along the frame. This bar has a notch 33 engaging a block 34 on the frame and is maintained in position laterally by a guide 35 spaced from the frame. The bar 32 has a handle 36 whereby it may be operated.

During the operation of the machine, rotation of the crank 16 will cause oscillation of the carrier 19, which in turn will transmit the movement to the actuator 25 through the medium of the reduced portion 22 of the carrier and the chains 23. Now it will be noted that the spring 29 will be placed under tension during the movement of the actuator in one direction and will return the actuator. The lug 31 on the bar 32 will, however, form an abutment for this spring while the block 34 engages the notch 33, but if this abutment is released, by lifting the handle 36 swinging the bar about the lug 31 as a pivot (it being understood that the lug has a loose connection with the actuator), the tension of the spring 29 will be relieved so as to fail to return the actuator with the result that this actuator is rendered ineffective for operation.

*The bottle inverter.*

Referring more particularly to Figures 6 to 9 inclusive, and also 1 to 4 inclusive, the carrier 19 has mounted therein a head 40 which is mounted for rotation on the shank 20. The carrier and the head have reduced hubs which are encircled by a spring 41 inside of the carrier and connected at one end to the carrier and at its other end to the head so as to establish a torsional yielding connection between the head of the carrier.

The head has mounted thereon a bracket 42 carrying a bearing 43 upon which is pivoted a bar or support 44. Mounted on this bar or support is a receiver 45 which may be of sheet metal which is closed at one end and open at the other, the closed end being provided with a stop or buffer 46 of asbestos or the like. The receiver has a guide 47 engaging the support 44 and slidable therealong, and in order to secure it in any position of adjustment, the guide 47 is provided with a latch 48 adapted to engage any one of a number of recesses 49 in the support. The receiver, therefore, is adapted to rock about its transverse axis on the support, while it is mounted to rotate with the support on the head 40 and the carrier 19. The closed end of the receiver with the projecting support causes this receiver to normally stand by gravity with its closed end down and during any rotative movement with the receiver in that position the bar or support 44 slides on a circumferential cam 50 mounted on a bracket 51 which is secured by a set screw 52 to the stationary shank 20. The bracket 51 carries a radially extending lug 53 in which is mounted a stop screw 54. The short end of the support 44 is provided with a cam roll 55 adapted, upon rotation of the head 40 to engage the stationary cam 50.

During the operation of the machine and the oscillation of the carrier 19 as heretofore described, the receiver will oscillate with the carrier. When the receiver is in the position shown in Figures 4 and 6, with its open end cooperating with the spout 1, the support 44 will rest on the cam 50 in a downwardly inclined position. At this time the head 40 will be arrested by engagement of the bracket 42 with the stop screw 54 and the spring 41 will yield to permit excess movement of the carrier 19. This will accurately aline the receiver with the spout 1 so that the bottle discharged from the bottle forming machine in inverted position will slide down the spout 1 and into the receiver with the neck end abutting against the closed end of the receiver. Thereafter upon return oscillation of the carrier 19, the receiver will be oscillated therewith from the position shown in Figures 4 and 6 to the position shown in Figures 2 and 7. This will cause the cam roll 55 to engage the cam 50 thereby swinging the receiver support and the receiver thereon down so that the open end of the receiver now inclines downwardly thereby discharging the bottle therein with its end down into the placer hereinafter to be described. The receiver, therefore, receives the bottle neck down, then inverts it and delivers it end down to the placer.

The placing mechanism.

Referring to Figures 1, 2 and 4, 60 designates a pair of arms pivoted at their lower ends on the frame 4 and connected by a plate 61 upon which are adjustably mounted a pair of guides 62 so as to receive the bottle from the inverter. Extending from the bracket 26 to the cooling table, hereinafter to be described, is a guide or support 63 for the lower end of the bottle. The arms 60 are connected by links 64 to a pair of cranks 65 fixed to opposite ends of a short shaft mounted to rock in a bracket 66 fixed to the actuator 25. One or both of the cranks 65 are connected by a spring 67 to an extension 68 on the bracket 66.

During the operation of the machine, the actuator 25 will, through the connections described, oscillate the arms 60 so as to move the placer from the position shown in Figure 2 to the position shown in Figure 4 and back. The mechanism is so timed that the placer will be in the position shown in Figure 2 when the receiver is inverted to deposit the bottle therein and thereafter the placer moves the bottle along the guide 63 so as to place it on the cooling table. The cooling table is as hereinafter described provided with stops and in order to permit the bottle to be accurately placed in engagement with a stop, the yielding connection including the spring 67, is provided between the actuator 25 and the placer.

The cooling table.

Referring to Figures 1, 2, 3, 4 and 12, 70 designates a carrier which is provided with a hub 71 mounted for rotation on a stem 72 which stem is mounted in the frame 4 and forms a continuation of the shank 8. The carrier is provided with a series of recesses 73 (Figure 12) receiving a series of facings 74 of asbestos which are secured by screws 75. These facings form bottle seats and it will be noted that the recesses and the facings incline downward towards the axis of the carrier so as to position the bottles on the seats with the tips inclined towards the axis. This prevents the bottles from tipping over on account of the centrifugal force caused by rotation of the carrier.

The carrier has mounted thereon a series of arms 76 adapted to receive the shanks 77 of radial gages 78, the shanks being clamped in the arms by set screws 79. These gages form stops for positioning the bottles on the carrier and it is against these stops that the placer sets the bottles as heretofore described, requiring, therefore, a yielding connection between the placer and the actuator.

Mounted for sliding and rotary adjustment on the hub 71 are two supports 80 and 81, the support 80 having a hub 82 provided with a set screw 83 adapted to engage the hub 71 and the support 81 being threaded to receive a clamping screw 84 engaging the segmental slot 85 in the support 80. The support 81 is further threaded to receive a screw 86 which passes through a segmental slot 87 in the support 80. The supports have radially projecting arms each carrying guides 88 and 89 respectively, these guides being adapted to engage the necks of the bottles on the carrier, it being noted that for every seat there is a pair of guides comprising a guide member on one support and a guide member on the other support. These guides are of resilient construction so as to yieldingly engage the necks of the bottles.

By loosening the set screw 83, the supports 80 and 81 may be concurrently raised or lowered by manipulation of the screw 86 so as to adjust the guides to different heights of bottles and after the adjustment has been completed, the supports are locked in adjusted position by means of the set screw 83. In order to adjust the guides to bottle necks of different diameters, the clamping screw 84 is loosened and the supports 80 and 81 can then be rotated relatively in order to spread or contract the resilient guides 88 and 89 and after the adjustment has been completed, the parts are locked in the position of adjustment by tightening the clamping screw 84.

The periphery of the carrier is provided with a series of teeth 90 in number corresponding to the number of bottle seats, adapted to be engaged by a spring pressed pawl 91 on a lever 92 pivoted on the shank 72. The arm 92 has a radial slot 93 in which slides a block 94 on one end of a link 95, the other end of which is pivoted on a block 96 on the actuator 25. Adjustable in the slot 93 are a pair of stops 97, and 98, each of which comprises a bolt passing through the slot and provided at its lower end with a nut. In this way, the stops may be adjusted along the slot and locked in any desired position of adjustment.

Mounted on a bracket 99 on the frame 4 is a stop pawl 100 engaging the teeth 90 so as to prevent retrograde movement of the carrier. Mounted also on this bracket 99 is a yielding brake shoe 101 connected by a spring 102 loosely with the arm 92.

During the operation of the machine, the placer will operate to place on the bottle seat a bottle, the mechanism being so timed that this occurs while the table is at rest while the pawl is moving back and at which time a bottle seat is placed directly opposite a guide 63. The bottle will, therefore, be placed on this bottle seat with its bottom abutting against the stop 78 and with its neck between the resilient guides 88 and 89. After the placer has returned clear of the bottle and the bottle seat the pawl 91 returns and the carrier is moved forward the distance between two bottle seats so as to move the filled bottle seat out of the path of the inclined guide 63 and so as to place a new bottle seat in cooperative relation with the guide. During the first part of the movement of the carrier, the spring tension 102 is relieved so that the brake shoe 101 will only loosely bear against the carrier. During the latter part of the movement of the carrier, however, the tension of the spring is placed on the brake shoe so as to firmly move this brake shoe into engagement and, therefore, brake the movement of the carrier so as to retard it, stop it and prevent it from overthrowing. This tension is maintained until the pawl carrying arm moves nearly back to original position. The carrier is moved successively in the direction of the arrow, Figure 3, step by step so as to move the bottles from the point of entrance to the point of delivery to the assembling table at which point the bottles are taken off and delivered to the assembling table in the manner hereinafter to be described.

It will be noted that the block 94 has an idle movement so that the arm 92 is only moved at the ends of the movements of the actuator 25. The carrier is, therefore, maintained at rest for a considerable period. Moreover this enables the movement of the table to be also adjusted. This is not only advantageous for initial adjustment but it also enables the carrier to be given a double movement through the distance between two bottle seats. This is advantageous where it is desired to speed up the machine to double speed and more particularly where the cooling period is to be decreased for certain classes of bottles which is desired shall not cool for such an extent.

*The assembling table and take-off.*

Referring to Figures 1, 2, 3, 4, 10 and 11, mounted on the bracket 99 and on a similar bracket 105 is a table 106 provided with a pair of guides 107 arranged for lateral adjustment on the table to provide a guideway extending radially from the cooling table. The guides 107 are flared at the entrance to the assembling table as shown at 108 so as to permit the bottles to readily pass from the cooling table onto the assembling table. Mounted on the shank 72 is a bracket 109 having projecting therefrom a pair of guides 110 adapted to be engaged by the necks of the bottles, the guides flaring at the entrance to the assembling table. The bracket is mounted for vertical adjustment on the shank 72 and is adapted to be secured in adjusted position by means of a set screw 111. The parts are so constructed that when the cooling table comes to rest, one of the bottle seats will be positioned opposite the entrance to the assembling table as shown in Figure 1 so as to permit a bottle to be read- ily conveyed from the cooling table to the assembling table.

Mounted to slide in the brackets 99 and 105 is a bar 112 which is encircled by a spring 113 bearing at one end against the bracket 105 and at its other end against a collar 114 on the rod. Fixed to the bar 112 is a block 115 which carries an arm 116 having adjustably secured to its upper end a slide 117 carrying a plate 118 faced with asbestos or any other suitable material adapted to act as a buffer. The plate 118 extends across the cooling table at the entrance of the assembling table so as to be behind a bottle positioned on the cooling table at that entrance. The lower end of the arm 116 is normally arranged in the path of a lug 119 on a collar 120 fixed to the actuator 25. The inside lower face of the arm 116 cooperates with a bevel 122 on a bracket 123 adjustably mounted on the frame 4. The lagging face of the lug 119 is furthermore beveled as shown at 121. Mounted on but outstanding laterally from the bracket 28 is a resilient plate 124 which terminates and flares at its free end opposite the cam face 122, but the body thereof extends parallel to the side face of the frame.

The brackets 105 are mounted for vertical adjustment being secured by screws 125. The slide 117 is furthermore adjustably mounted on the upper end of the arm 116 and secured by screws 126. A light spring 127 encircles the projecting end of the bar 112 and bears at one end against a collar 128 on the bar and at its other end against a stirrup 129, one of whose ends encircles the bar and the other of which has passing therethrough a bolt 130 passing loosely through the bracket 105 engaged by a winged nut 131 and encircled by a spring 132.

During the operation of the machine, reciprocation of the actuator 25 will cause reciprocation of the take-off 118. Assuming that the take-off rests behind the bottle on the cooling table at the entrance to the assembling table, at this time the actuator will be in its right position and the lug 119 thereon will be behind the lower end of the arm 116 on the take-off, this arm being at this time held in the path of the lug by gravity and by the resilient guide 124 bearing thereagainst. As the actuator 25 moves forward or to the left Figure 2, the take-off will be carried with it thereby placing the spring 113 under tension. This movement causes the take-off to engage the bottle on the cooling table as shown in Figure 1 so as to move this bottle onto the assembling table, the neck passing out of engagement with the guides 88 and 99 and into engagement with the guides 110 so as to place the bottle in the position occupied by the first bottle on the assembling table

Figure 2. At this time, the lower end of the arm 116 will have engaged the inclined face on the bracket 122 thereby swinging the lower end of the arm to the left Figure 11 carrying with it the bar 112 so as to move this bar out of engagement with the tooth 119. The spring 113 which has been placed under heavy tension will now operate to immediately return the take-off to normal position Figure 2 and as it does so, the lower end of the arm 116 will drop by gravity and engage the flaring end of the guide 124 and return this arm to normal position in the path of the lug 119. As the actuator 25 now returns carrying the tooth 119 with it, the inclined face 121 on the lagging side of the tooth will engage the arm 116 causing it to swing so as to permit this lug to pass onto the other side of the arm, the spring guide 124 yielding during such operation. The parts will then be in position for repeated operation.

It will, therefore, be seen that the take-off is moved in one direction by the actuator, released and caused to return by a spring which has been placed under tension. The result is, therefore, that the take-off is quickly returned so as to be in the path of the next bottle moved in alinement with assembling table during the next operation. This quick return movement will ordinarily, however, cause a shock and to provide buffing mechanism, the light spring 127 and 132 are provided which while they absorb the shocks, due to the tensioning of the strong spring 113, operate to locate the take-off in final correct position. The leaf spring 124 also acts as a brake. It will further be noted that the take-off operates in a direction along the assembling table so as to move the assembled bottles in a row by engagement of the last placed bottle therewith.

Résumé of operations.

In the general operation of this device, the bottles are successively delivered from the bottle forming machine neck down into the spout or trough 1. They then slide successively down into the receiver which at this time is in the position shown in Figure 4. The receiver then turns and rocks thereby throwing the bottle with bottom down into the placer which at this time is in the position shown in Figure 2 ready to receive it. The placer now moves the bottle along the inclined guide 63 so as to position it on the cooling table and on one of the inclined bottle seats thereon against the adjustable stop, the connections yielding during such placing of the bottle. The bottle is now carried along with the table during its intermittent movement, the period depending upon the nature of the work and whether a full cooling period or only a part of a cooling period is desired. After the bottle on the cooling table seat comes opposite the entrance to the assembling table, it will be in the path of the take-off and this take-off will now operate to place the bottle on the assembling table. In placing this bottle on the assembling table, the last bottle placed thereon will push the preceding bottles along the table so that a number of them will be lined up against one another on the assembling table, the bottles being sufficiently cooled at this time to prevent damage by their contact. After a sufficient number have been placed on the assembling table, the workman will insert a paddle or tong over the necks of a considerable number of these bottles arranged along the assembling table, lift them off and place them in the leer.

It will, therefore, be seen that the invention accomplishes its objects. The bottles are successively inverted, placed, cooled while held separated and then assembled ready to be conveniently taken off and placed in the leer. The mechanism operates in timed relation so that the maximum speed can be obtained without any interference.

It is obvious that various changes may be made in the details of construction without departing from the spirit of this invention. It is, therefore, to be understood that this invention is not to be limited to the specific construction shown and described.

Having thus described the invention, what is claimed is:

1. In a bottle handling device, the combination with a cooling table on which the bottles are adapted to rest for a definite period before being further handled, of an assembling table distinct from said cooling table and adapted to receive the bottles directly therefrom, means for delivering the bottles from a bottle forming machine to said cooling table, means cooperating with said cooling table adapted to vary the cooling period of the bottles thereon, and means for delivering the bottles from said cooling table directly to said assembling table.

2. In a bottle handling device, the combination with a cooling table on which the bottles are adapted to rest for a definite period before being further handled, of means cooperating with said cooling table adapted to vary said rest period, an assembling table distinct from said cooling table and adapted to receive the bottles directly therefrom, means for moving said cooling table adapted to position the bottles successively for delivery to said assembling table, and means for delivering the bottle successively from said cooling table directly to said assembling table.

3. In a bottle handling device, the combination with a cooling table on which the bottles are adapted to rest for a definite period before being further handled, of means cooperating with said cooling table adapted to vary said rest period, a bottle receiver and an assembling table distinct from said cooling table and cooperating therewith, means for delivering the bottles from said receiver to said cooling table, means for moving said cooling table and the bottles thereon, and means for delivering the bottles from said cooling table directly to said assembling table.

4. In a bottle handling device, the employment of a bottle inverter comprising, a carrier, a single bottle receiver mounted to rock on said carrier to invert the bottle, means for oscillating said carrier from bottle-receiving to bottle-discharging positions, and means operated upon oscillation of said carrier adapted to rock said receiver on said carrier, whereby upon a single oscillation of said carrier and the rocking of said receiver thereon, the bottle is moved from receiving to discharging position and inverted during such movement.

5. In a bottle handling device, the employment of a bottle inverter comprising, a carrier, a single bottle receiver mounted to rock on said carrier to invert the bottle, means for oscillating said carrier from bottle-receiving to bottle-discharging positions, and means operated upon movement of said carrier adapted to positively rock said receiver on said carrier to bottle discharging position, whereby upon a single oscillation of said carrier and the rocking of said receiver thereon, the bottle is moved from receiving to discharging position and inverted during such movement.

6. In a bottle handling device, the employment of a bottle inverter comprising, a carrier, a bottle receiver mounted to rock on said carrier, means for oscillating said carrier, means operated upon movement of said carrier adapted to rock said receiver on said carrier, and an adjustable stop for arresting said receiver.

7. In a bottle handling device, the employment of a bottle inverter comprising, a carrier, a bottle receiver mounted to rock on said carrier, means for moving said carrier, means operated upon movement of said carrier adapted to rock said receiver on said carrier, an adjustable stop for arresting said receiver, and a yielding actuating connection to said carrier.

8. In a bottle handling device, a cooling table, comprising, a movable bottle-receiving carrier on which the bottles are adapted to rest, guides adapted to engage the bodies of the bottles, pairs of guides adapted to engage the necks of the bottles to retain them in upright position on the carrier, supports for said neck guides, and means for adjusting said supports so as to concurrently adjust the guides of all pairs relatively to each other.

9. In a bottle handling device, a cooling table, comprising, a movable bottle-receiving carrier on which the bottles are adapted to rest, guides adapted to engage the bodies of the bottles, pairs of guides adapted to engage the necks of the bottles to retain them in upright position on the carrier, supports for said neck guides, means for adjusting said supports so as to concurrently adjust the guides of all pairs relatively to each other, and means for adjusting said supports towards and from said carrier.

10. In a bottle handling device, the employment of a cooling table comprising, a carrier having bottle seats, a pair of adjustable supports, guides on each support adapted to engage the bottle necks, and means for adjusting said supports towards and from said carrier.

11. In a bottle handling device, the employment of bottle take-off mechanism comprising, a reciprocating take-off, an actuator therefor, and means adapted for manipulation during the operation of said mechanism for disconnecting said take-off from said actuator.

12. In a bottle handling device, the employment of actuating mechanism comprising, a reciprocating actuator, means for moving said actuator in one direction, means for moving said actuator in the other direction, and means adapted for manipulation during the operation of said mechanism for rendering said last means ineffective.

13. In a bottle handling device, the employment of actuating mechanism comprising a reciprocating actuator, means for moving said actuator in one direction, a spring for moving said actuator in the other direction, and means adapted for manipulation during the operation of said mechanism for rendering said spring ineffective.

14. In a bottle handling device, the employment of a frame for the bottle handling mechanism, and means for pivotally supporting said frame to swing about a point adjacent the point of discharge of the bottles from a bottle forming machine.

15. In a bottle handling device, the employment of a frame for the bottle handling mechanism, and means for pivotally supporting said frame to swing about a point adjacent the point of delivery of the bottles to said bottle handling mechanism.

16. In a bottle handling device, the combination with an assembling table, of a reciprocating take-off movable in a direction along said table, adapted to successively deliver the bottles on and move them along said table, guides on said table adapted to engage the bodies of the bottles, and guides at the entrance of said table adapted to engage the necks of the bottles to maintain them in upright position while being acted upon by said take-off.

17. In a bottle handling device, the combination with a cooling table, of means cooperating with said table adapted to vary the cooling period of the bottles thereon, an assembling table arranged to receive the bottles therefrom, and a take-off movable in a direction along said assembling table, adapted to successively deliver the bottles from said cooling table on said assembling table and adapted to move the assembled bottles along said assembling table.

18. In a bottle handling device, the combination with a cooling table, of means cooperating with said table adapted to vary the cooling period of the bottles thereon, an assembling table arranged to receive the bottles therefrom, a take-off movable in a direction along said assembling table, adapted to successively deliver the bottles from said cooling table on said assembling table and adapted to move the assembled bottles along said assembling table, and means for successively moving the bottles on said cooling table in the path of said take-off.

19. In a bottle handling device, the combination with a cooling table, of means cooperating with said table adapted to vary the cooling period of the bottles thereon, an assembling table arranged to receive the bottles therefrom, a take-off movable in a direction along said assembling table, adapted to successively deliver the bottles from said cooling table on said assembling table and adapted to move the assembled bottles along said assembling table, and means for moving said table to successively move the bottles thereon in the path of said take-off.

20. In a bottle handling device, the combination with a cooling table on which the bottles are adapted to rest for a definite period before being further handled, of means cooperating with said table adapted to vary the cooling period of the bottles thereon, a bottle receiver and an assembling table cooperating therewith, means for operating said receiver to invert the bottles, means for delivering the bottles from said receiver to said cooling table, and means for delivering the bottles from said cooling table direct to said assembling table.

21. In a bottle handling device, the combination with a cooling table on which the bottles are adapted to rest for a definite period before being further handled and comprising a carrier having bottle seats, with means for cooperating with said carrier adapted to move the bottles from the point of entry to the point of delivery, and means for varying the rate of movement adapted to vary the cooling period.

22. In a bottle handling device, the combination with a cooling table on which the bottles are adapted to rest for a definite period before being further handled and adapted to receive the bottles in spaced relation thereon, of means cooperating with said table adapted to vary the cooling period of the bottles thereon, an assembling table adapted to receive the bottles in mutual engagement thereon, and means for delivering the bottles from said cooling table direct to said assembling table.

23. In a bottle handling device, the employment of a bottle inverter comprising a carrier, a support mounted to rock on said carrier, and a receiver mounted for adjustment along said support.

In testimony whereof, I have hereunto affixed my signature this 6 day of March, 1919.

HANS HILLMANN.